United States Patent [19]

Dunn et al.

[11] Patent Number: 5,245,485
[45] Date of Patent: Sep. 14, 1993

[54] MULTIPLE TAPE THICKNESS, MULTIPLE RECORDING FORMAT TAPE DRIVE SYSTEMS

[75] Inventors: Edwin C. Dunn; Orvid B. Jeppson; Steven B. Wilson, all of Tucson, Ariz.

[73] Assignee: International Business Machines Corporation, Armonk, N.Y.

[21] Appl. No.: 753,242

[22] Filed: Aug. 30, 1991

[51] Int. Cl.⁵ ............................................. G11B 15/43
[52] U.S. Cl. ....................................... 360/69; 360/71; 360/75; 360/73.06
[58] Field of Search ....................... 360/69, 71, 75, 137

[56] References Cited

U.S. PATENT DOCUMENTS

| | | | |
|---|---|---|---|
| 3,842,326 | 10/1974 | Stocker | 360/73.04 |
| 4,125,881 | 11/1978 | Elge et al. | 360/50 |
| 4,237,371 | 11/1980 | Kamoto | 364/561 |
| 4,280,159 | 7/1981 | Nakayama | 360/137 |
| 4,334,656 | 6/1982 | Crawford et al. | 242/195 |
| 4,389,600 | 6/1983 | Milligan et al. | 318/6 |
| 4,399,936 | 8/1983 | Rueger | 226/92 |
| 4,406,425 | 9/1983 | Bullock et al. | 242/183 |
| 4,435,762 | 3/1984 | Milligan et al. | 364/200 |
| 4,452,406 | 6/1984 | Richard | 242/195 |
| 4,454,282 | 6/1984 | Bradshaw et al. | 524/407 |
| 4,467,411 | 9/1984 | Fry et al. | 364/200 |
| 4,525,424 | 6/1985 | Bradshaw | 428/425.9 |
| 4,531,166 | 7/1985 | Anderson | 360/73.04 |
| 4,541,027 | 9/1985 | Danielsen et al. | 360/137 |
| 4,568,611 | 2/1986 | Amirsakis et al. | 428/425.9 |
| 4,644,436 | 2/1987 | Unno | 360/137 |
| 4,685,005 | 8/1987 | Fields, Jr. | 360/53 |
| 4,956,730 | 9/1990 | Arai et al. | 360/73.06 |

Primary Examiner—John S. Heyman
Attorney, Agent, or Firm—Manny W. Schecter

[57] ABSTRACT

The invention is one or more tape systems which determine the length of tapes mounted therein to assess the thickness of such tapes. A format identifier is written at one of a plurality of locations on the tape depending upon the tape thickness. The format identifier for a relatively thin tape is written further from the leader block than that for a relatively thick tape, thereby avoiding the writing of user data in a region of the tape embossed with wrap deformations. The thickness determination is combined with a determination of the tape format to assess the compatibility of a desired operation on a tape mounted in a tape system therewith. If the operation is not compatible with the tape and the tape system, the tape system will not permit such operation to continue. A method for operating the tape systems is also disclosed, and accounts for various contingencies, such as blank tapes and marginal determinations of tape thickness.

32 Claims, 9 Drawing Sheets

| BITS | DESCRIPTION |
|---|---|
| 0 | 0 = SELECT ODD SET OF 18 TRACKS<br>1 = SELECT EVEN SET OF 18 TRACKS |
| 1 | 0 = 36-TRACK FORMAT<br>1 = 18-TRACK FORMAT |
| ⋮ | ⋮ |
| 3 | 0 = THICK TAPE<br>1 = THIN TAPE |
| 4 | 0 = NO CHANGE OF POSITION<br>1 = CHANGE OF POSITION |
| ⋮ | ⋮ |

18 TRACK TAPE SYSTEM

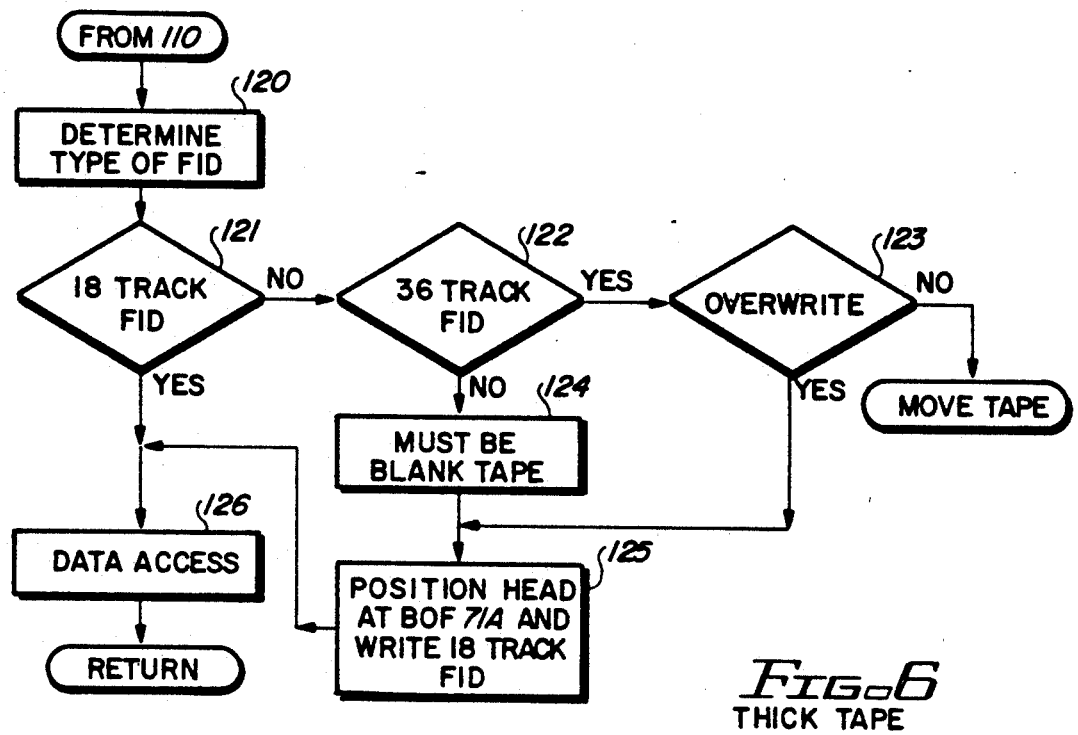
FIG. 6 THICK TAPE
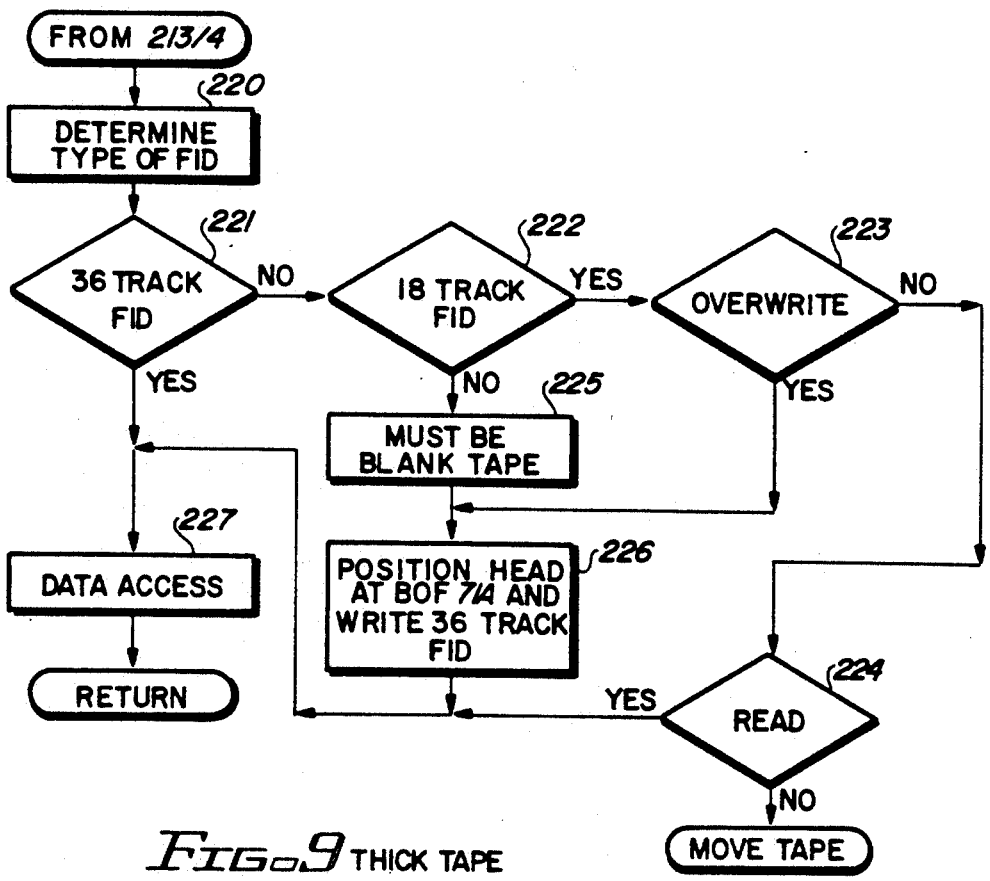
FIG. 9 THICK TAPE

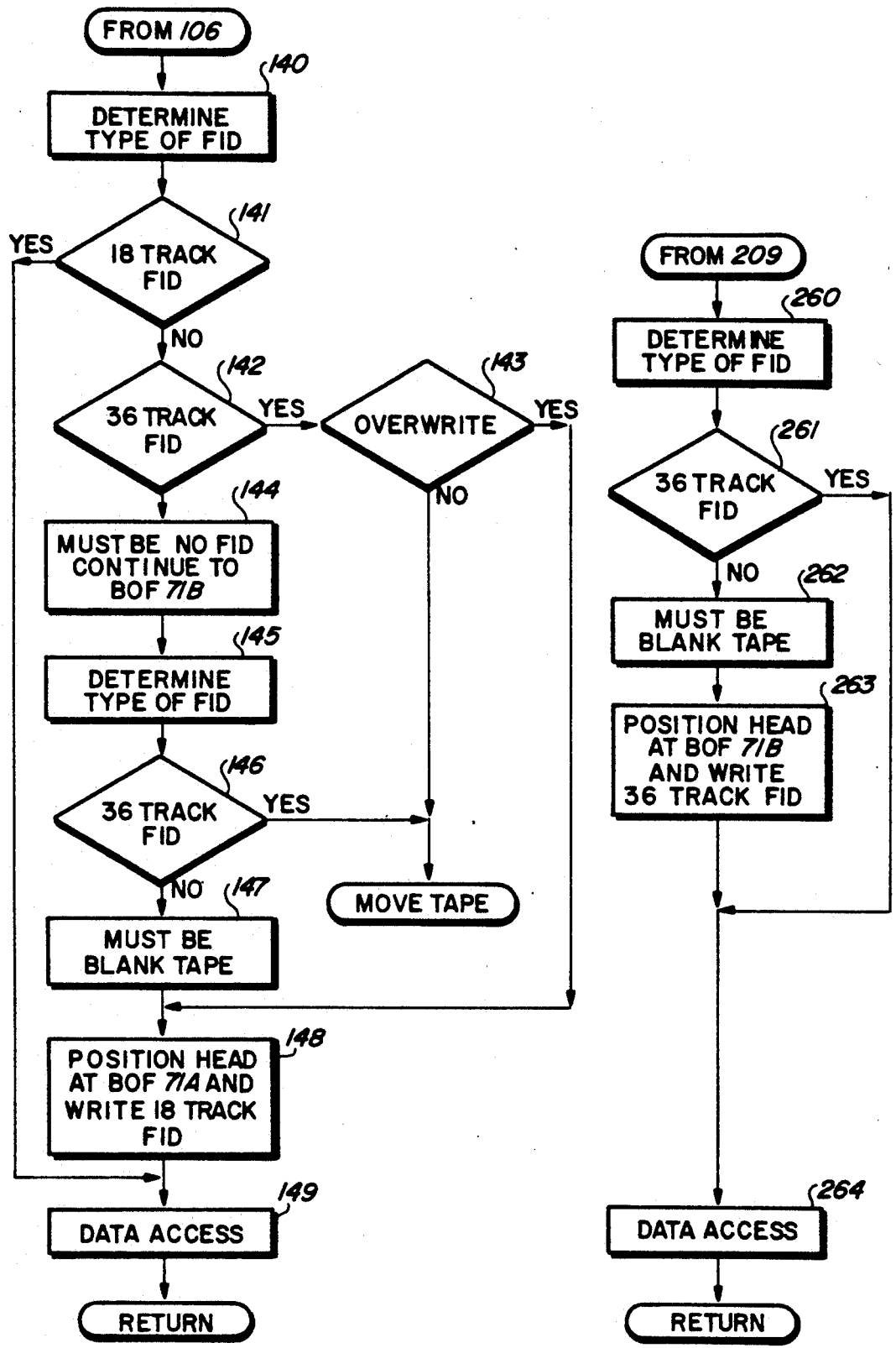

36 TRACK SYSTEM

TAPE LENGTH MARGINAL,
BUT ASSUMED THIN

MULTIPLE TAPE THICKNESS, MULTIPLE RECORDING FORMAT TAPE DRIVE SYSTEMS

BACKGROUND OF THE INVENTION

1. Field of the Invention

This invention relates to multiple tape thickness, multiple recording format tape drive systems. More particularly, the invention relates to the ability of a tape system to distinguish between different tape thicknesses and recording formats.

2. Description of the Related Art

Modern tape drive systems use a reel-to-reel drive to move a tape back and forth in close proximity to one or more read and/or write transducing heads. In some tape systems, certain characteristics of a tape cartridge are determined and used to improve system performance. For example, many video tape systems are capable of recording at different tape speeds and, to enable proper playback, of determining the speed at which such recording occurred. Also, some tape systems determine the amount of tape wound upon a tape reel. For example, U.S. Pat. Nos. 4,644,436, 4,280,159, and 4,237,371 describe measuring the amount of tape on a reel to enable the system to indicate the remaining recording and/or playback time. U.S. Pat. Nos. 4,644,436 and 4,280,159 also infer the thickness of a tape from amount of tape measured on a reel. U.S. Pat. Nos. 4,541,027 and 4,389,600 describe measuring the amount of tape wound on a reel to adjust the torque applied to the tape drive motors to maintain proper tape tension during tape drive operation.

The length and format of a tape are also determined in the IBM 3480 and 3490 Magnetic Tape Subsystems (hereinafter referred to simply as "old" IBM tape systems for convenience). Upon insertion of a single reel tape cartridge into a tape drive, a leader block attached to the longitudinal end of the tape is automatically threaded through the tape path and the tape is spooled upon the take-up reel. During such threading and spooling, the length of tape wound upon the supply reel (the single reel tape cartridge inserted into the tape drive) is determined using tachometers on the supply and take-up reels. The tachometers are used to measure the amount of rotation of such reels during a specified period. The amount of rotation of the supply reel during one or more rotations of the take-up reel (a physical measure of tape circumference) is inversely related to the amount or length of tape on the supply reel. Thus, the length of tape wound upon the supply reel can be determined, without actually measuring the entire length of the tape, using well known mathematics. The length of tape measurement is used to properly maintain a constant tape tension for the most reliable system operation, and for rejecting out of specification tape cartridges.

Upon threading of the tape in an old IBM tape system, a deformation is formed in the tape as it wraps upon itself on the take-up reel. Depending upon the conditions, the deformation may become embossed in the tape. Reliable reading and/or writing may not be possible at or near such a deformation. The old IBM tape systems record user data in 18 parallel tracks, as is known, including two 8-bit bytes and two parity bits (one parity bit for each byte) across the tape width. Because each bit is recorded at a single tape location, the lack of a smooth recording surface at the head-tape interface can result in the irreparable loss of one or more bits. Fortunately, the deformation decreases with each successive wrap of the tape upon the take-up reel. The amount of tape required to be wrapped upon the take-up reel to decrease the deformation to a size small enough to permit reliable read/write activity can be determined experimentally. Thus, enough tape is spooled upon the take-up reel to ensure that the recording of data does not begin until such can occur reliably.

In an old IBM tape system, the point on a tape at which the recording of user data is first permitted is referred to as the logical beginning of tape (LBOT). For ease of understanding, LBOT is hereinafter referred to as the beginning of user data (BOD). The location of the BOD is defined by the tape system control unit. In an old IBM tape system, the first user data recorded after the BOD is customarily the volume serial number (VOLSER). A volume is a physical data unit for convenient handling. In a tape system, the data recorded on a single tape cartridge is considered to be a volume as it can be conveniently mounted in a tape drive.

A format identifier (FID) is a pattern recorded on a tape prior to the BOD. The specific pattern used, also referred to as the "type" of FID, is indicative of the format of data recorded (or to be recorded) after the BOD. The point on a tape where the FID begins is referred to in an old IBM tape system as the physical beginning of tape (PBOT). For ease of understanding, PBOT is hereinafter referred to as the beginning of format identifier (BOF). The BOF is defined in the tape device, not the tape system control unit, as a specified distance from the tape leader block. Although a FID is a form of recorded data, it is not user data, and can be reliably written to and read from the tape prior to the BOD, even in proximity to a deformation, because of the uniqueness of the recorded pattern. The old IBM tape systems record a FID as a unique 6-bit tone recorded on 9 of the 18 tracks in the tape width. The 6-bit tones are divided into 3 sets of 3 tracks each and are distributed across the 18-track tape width; each set of 3 tones being continuously repeated along the length of the tape between the BOF and the BOD. The tones in each set of 3 tracks can be compared until sufficient matching occurs to reliably identify the tone, and hence the type of FID, despite the existence of a deformation in the tape somewhere between the BOF and the BOD. The type of FID is therefore determined by the tape system, upon tape cartridge mounting, prior to the BOD being positioned in proximity to the transducing head.

By identifying the type of FID, a tape system can signal an operator to remove a tape cartridge therefrom if the format of data recorded on the tape is not compatible therewith.

The lack of a FID normally indicates a blank volume. When no FID is detected in an old IBM tape system, the tape is rewound from the BOD to the BOF and a FID is recorded therebetween upon receiving a command from the host processor to write user data, such as the VOLSER, after the BOD. Upon subsequent mounts of the tape, the proper FID should be identified. Should the host processor command that a tape be written or rewritten from the BOD (such as the VOLSER), the system writes the FID again. Should the host processor command that the tape be rewound, such an operation occurs under the control of the tape device, not the tape system control unit. Tape device control permits the control unit to logically disconnect from the tape device to direct other tape system operations. Because the BOF, and not the BOD, is known to the tape device, such tape device control results in the tape being rewound to the BOF. To access user data on the tape, the tape must subsequently be advanced past the BOD. The aforementioned tape movement between the BOF and the BOD significantly impacts tape system performance.

The IBM 3490E Magnetic Tape Subsystem (hereinafter referred to simply as the "new" IBM tape system for convenience) recently became available. This system records data in 36 parallel tracks using a 36-track interleaved read/write transducing head. Data is written in two sets of 18 interleaved tracks, including the same number of bits and bytes per set as in the 18-track format of an old IBM tape system. Beginning at a first longitudinal end of a tape, the first set of 18 tracks of data are written in a first direction of tape movement until the opposite end of the tape is approached. The direction of tape movement is then reversed and the second set of 18 tracks are written, interleaved among the first set of tracks, until the first end of the tape is again approached.

The old and new IBM tape systems currently employ the same "old" magnetic tape cartridge, including ½ inch wide magnetic tape. To achieve the increased number of tracks, a track written by a new IBM tape system is significantly narrower than a track written by an old IBM tape system. Data written by an old IBM tape system can be read by a new IBM tape system because the tracks are wider than the read/write elements of the new IBM tape system transducing head. However, user data written by a new IBM tape system cannot be read by an old IBM tape system because the tracks are too narrow to be reliably sensed by the read/write elements of an old IBM tape system transducing head. A different type of FID is written by the old and new IBM tape systems to distinguish data written in the 18-track format from data written in the 36-track format. The FID types are used by the tape systems to reject operations incompatible with an old tape cartridge mounted therein, thereby ensuring that all data written on a tape is in the same format.

The new IBM tape system writes a FID in a such a way as to enable the old IBM tape system to read such 36-track FID. The new IBM tape system writes the FID tones for the 36 track format on one set of 18 tracks as does the old IBM tape system. In addition, the new IBM tape system writes logical zeroes on the other set of 18 tracks (with the direction of tape movement reversed) from beyond the BOD to the BOF. The logical zeroes on the other set of 18 tracks are recognized as mere noise by the 18 track transducing head of an old IBM tape system during reading of the 36-track FID.

In the future, a "new" and currently unavailable magnetic tape cartridge may be marketed for use in the new IBM tape system. The new tape cartridge includes a cartridge shell similar to that of the current tape cartridge, but also includes a significantly greater length of tape therein. The increased tape length improves the data storage capacity of the new tape cartridge relative to the old data cartridge. To achieve the greater length of tape, the thickness of the tape in the new magnetic tape cartridge is reduced to allow for additional wraps thereof about the tape cartridge hub. Hereinafter, the tape in the old tape cartridge, or any other relatively thick tape, is referred to as "thick" tape and the tape in the new tape cartridge, or any other relatively thin tape, is referred to as "thin" tape. Unfortunately, the reduced thickness of thin tape renders it susceptible to perturbations which cannot be accommodated in an old IBM tape system, thereby preventing reliable read/write operations To upgrade an old IBM tape system to accommodate thin tape would require the costly replacement of certain components, eg, to adjust the tape tension therein. In addition, a heretofore unrecognized problem is how to make both thick and thin tapes compatible with the new IBM tape system. Operators might accidentally mount a tape cartridge in a tape system and request a desired action which is incompatible therewith.

Some tape systems are compatible with multiple tapes of different lengths or thicknesses. The length or thickness of a tape is generally of little significance to its compatibility with a particular tape system. The compatibility of a tape with a particular tape system is therefore not determined by the thickness or length of tape therein. In addition, the inherent nature of the recorded data in many such tape systems (audio or video signals in which a loss of a small portion of the signal is not critical) renders them much less susceptible to the aforementioned problem of deformations in a tape for use in a computer system. Thus, a heretofore unrecognized problem is how to accommodate multiple tape thicknesses and recording formats in tape systems.

SUMMARY OF THE INVENTION

In view of the foregoing, it is the principal object of this invention to improve tape systems.

Another object of this invention is a tape system which can distinguish between different tape lengths, thicknesses and recording formats.

Still another object of this invention is two tape systems each employing a different recording format and each being compatible with a relatively thick tape, but only one of which is compatible with a relatively thin tape, including means therein for recognizing such compatibility or incompatibility.

Still another object of this invention is a method for operating one of the aforementioned tape systems to determine whether a tape mounted therein is compatible therewith.

These and other objects of this invention are accomplished by tape systems which determine the length of tapes mounted therein to assess the thickness of such tapes. A FID is written at one of a plurality of locations on the tape depending upon the tape thickness. The FID for a relatively thin tape is written further from the leader block than that for a relatively thick tape, thereby avoiding the writing of user data in a region of the tape embossed with wrap deformations. The thickness determination is combined with a determination of the tape format to assess the compatibility of a desired operation on a tape mounted in a tape system. If the operation is not compatible with the tape and the tape system, the tape system will not permit such operation to be performed. A method for operating the tape systems is also disclosed, and accounts for various contingencies, such as blank tapes and marginal determinations of tape thickness.

The foregoing and other objects, features, and advantages of the invention will be apparent from the following more particular description of the preferred embodiment of the invention, as illustrated in the accompanying drawing.

BRIEF DESCRIPTION OF THE DRAWING

FIGS. 5-7 are operational flowcharts for an 18-track tape system.

FIGS. 8-11 are operational flowcharts for a 36-track tape system.

DESCRIPTION OF THE PREFERRED EMBODIMENT

Figure 1:
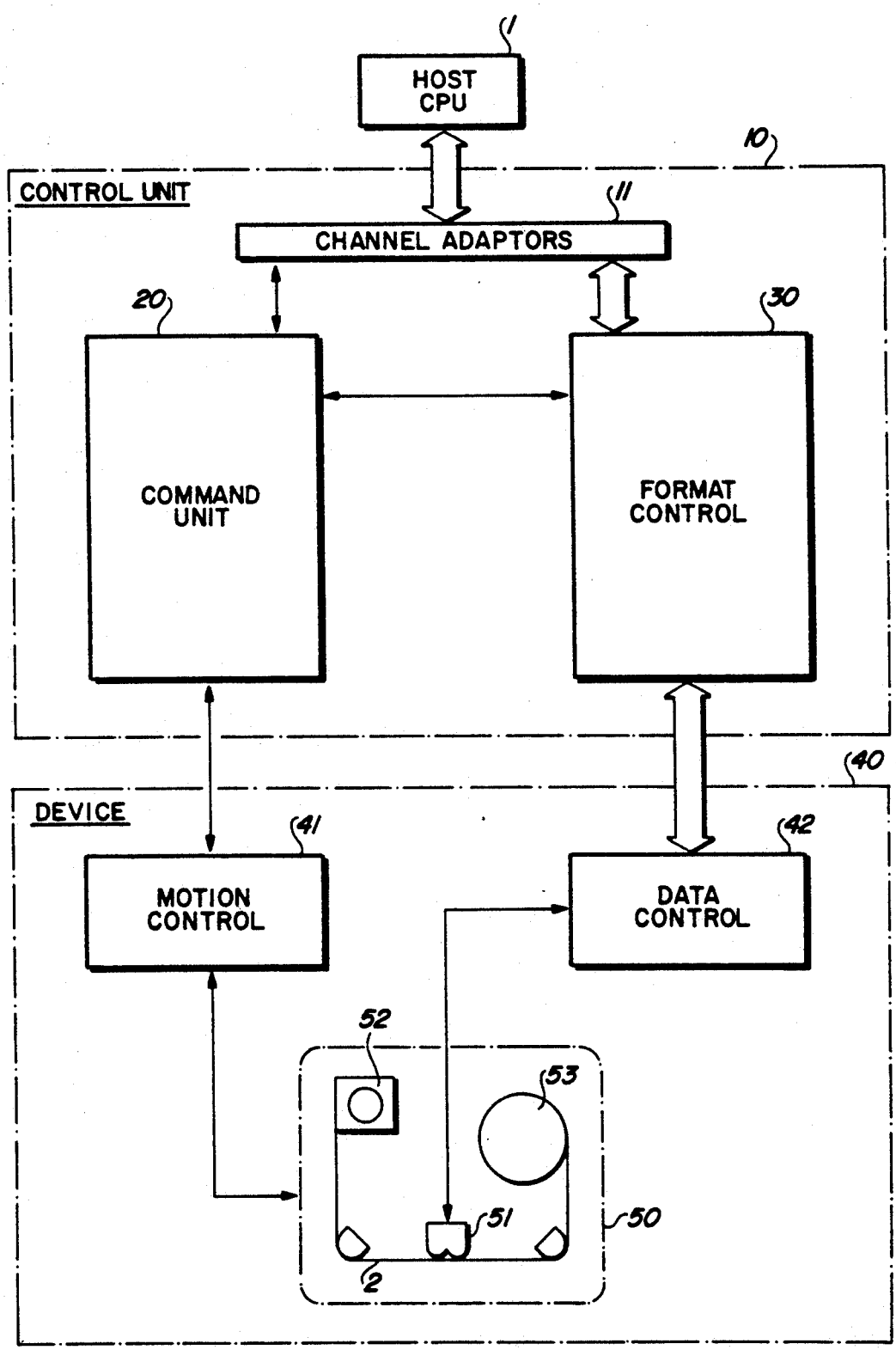
FIG. 1 is a schematic block diagram of a tape system according to the invention.

Referring now more particularly to the drawing, like numerals denote like features and structural elements in the various FIGS. The invention will be described as embodied in magnetic tape systems for use in data processing environments. Referring to FIG. 1, a data processing system is controlled by at least one host central processing unit (CPU) 1 to store, retrieve, and manipulate data. The data processing system includes one or more tape systems. In the preferred embodiment, the data processing system includes one or more 18-track IBM 3480 or 3490 Magnetic Tape Subsystems and one or more 36-track 3490E Magnetic Tape Subsystems upgraded as described herein. For convenience, the common features of the two aforementioned tape subsystems are shown as a single CPU and tape system in FIG. 1. The tape system includes at least one control unit 10 and at least one magnetic tape recording or playback device 40. The control unit 10 accepts commands and data from the CPU 1 via one or more channel adaptors 11, and controls the device(s) 40 accordingly.

Figure 2A:
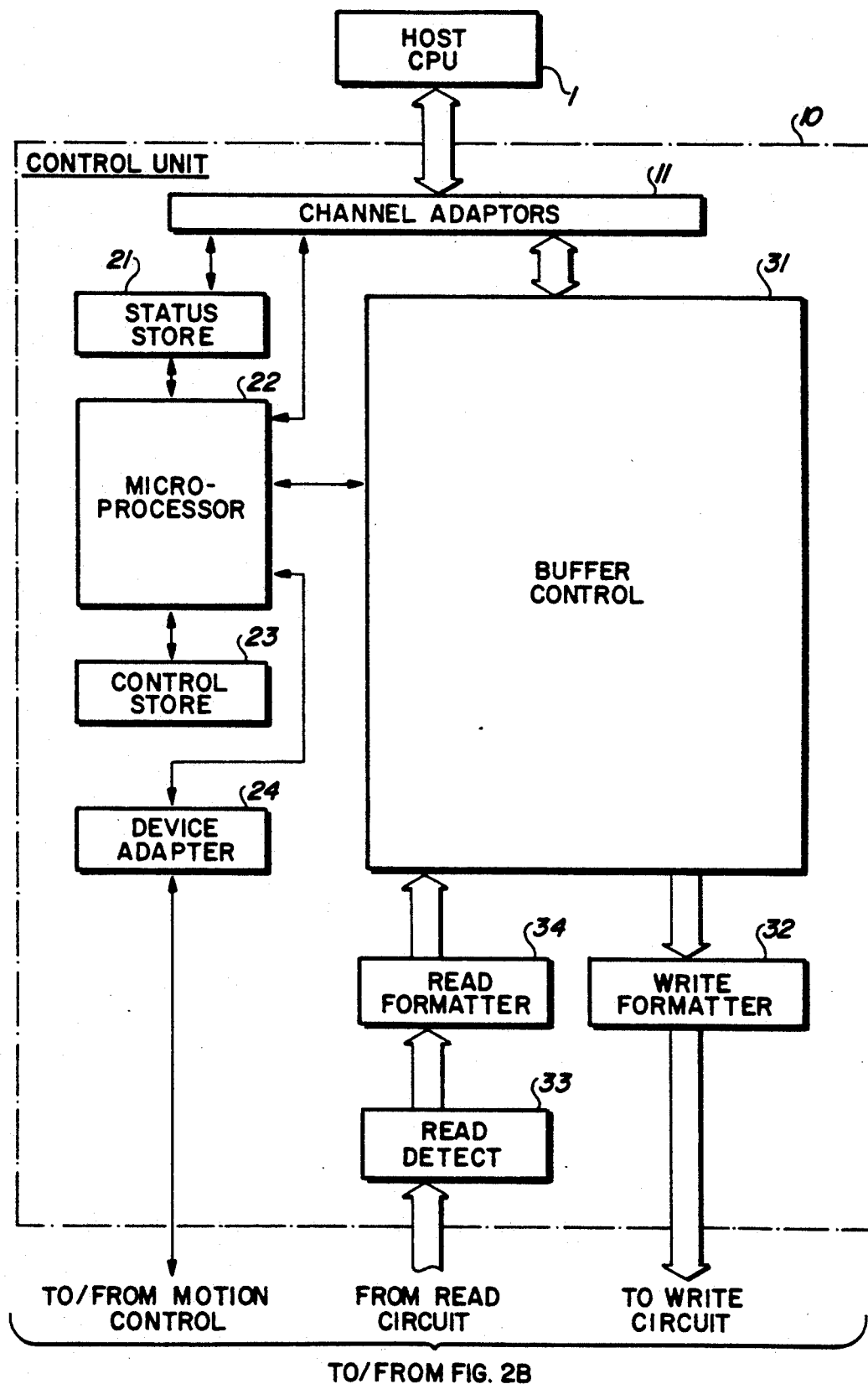
FIG. 2a is a schematic block diagram of the control unit of FIG. 1 in greater detail.
Figure 2B:
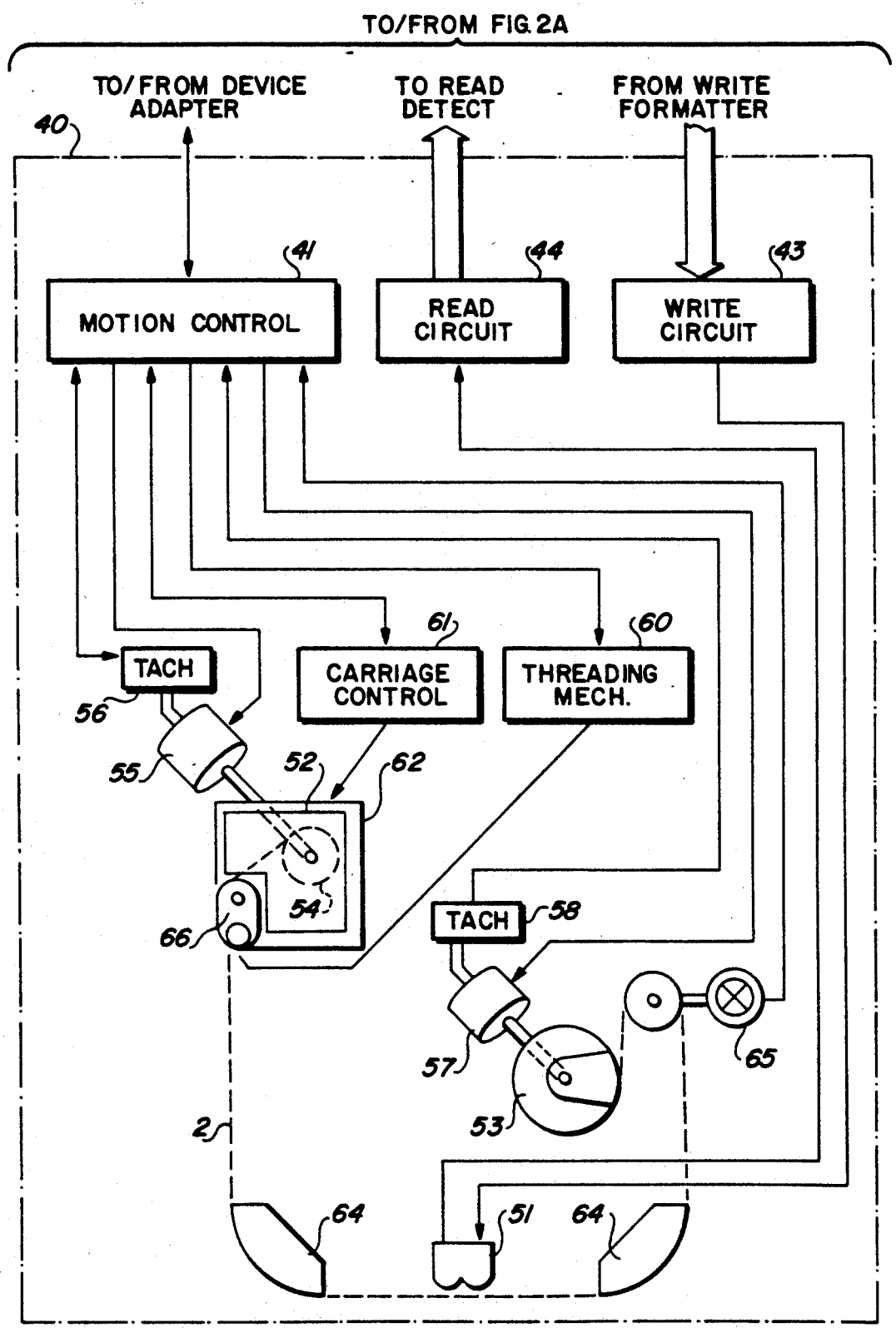
FIG. 2b is a schematic block diagram of the device of FIG. 1 in greater detail and couples to FIG. 2a as shown.

The device 40 includes a motion control 41 for controlling the handling of magnetic tape media, a data control 42 including read and write circuits to operate a magnetic transducing head 51, and a tape path 50 (including a tape cartridge 52 having a tape supply reel therein and a tape take-up reel 53) and for transporting a magnetic tape 2 past head 51 for writing data to and reading data from tape 2. The data control 42 is coupled to a format control 30 in control unit 10, which is in turn coupled to channel adaptors 11. The motion control 41 is coupled to a command unit 20 in the control unit 10, which is also coupled to channel adaptors 11. The command unit 20 accepts commands from the CPU 1 via channel adaptors 11 and controls the mechanical operation of the device 40, and also controls the flow of data between the channel adaptors 11 and tape 2 via the format control 30 and the data control 42. FIGS. 2A and 2B show FIG. 1 in additional detail. FIG. 2A shows additional detail of the control unit 10 and FIG. 2B shows additional detail of the device 40. FIGS. 2A and 2B couple together as shown. Referring to FIGS. 2A and 2B, the command unit 20 of FIG. 1 includes a status store 21, a microprocessor 22, a control store 23, and a device adapter 24. A buffer control 31 operates under control of the microprocessor 22 to store the data written on tape 2 by a write formatter 32 and a write circuit 43 which in turn is coupled to the head 51. The buffer control 31 also controls the flow of data during the reading of data on tape 2 to store such data transmitted by head 51 via a read circuit 44, a read detect 33, and a read formatter 34.

The movement of tape 2 in the device 40 is controlled by the motion control 41, which includes a microprocessor and control store similar to those in the control unit 10. The tape path includes a supply reel 54 in tape cartridge 52, a motor 55 for driving supply reel 54, a tachometer 56 for counting the number of revolutions of supply reel 54, a take-up reel 53, a motor 57 for driving take-up reel 53, and a tachometer 58 for counting the number of revolutions of take-up reel 53. The tape path includes various controls, such as two compliant tape guides 64, and a tape tension control 65. The tape cartridge 52 is located in a carriage 62 which is coupled to a carriage control 61. A threading mechanism 60 threads tape 2 through the tape path and spools it upon the take-up reel 53 using the leader block 66.

The head 51 is actually an 18-track magnetic transducing head (in the 18-track tape system) or a 36-track interleaved magnetic transducing head (in the 36-track tape system), depending upon the particular tape system. Each type of head writes a unique type of FID on tape 2 to indicate the recording format (18-track or 36-track) of data written thereby. In addition, the 36-track tape system includes two sets of tape tension information. The first set of such information drives reels 53 and 54 at a first constant tape tension to accommodate thick tape 2A and the second set of such information drives reels 53 and 54 at a second constant tape tension to accommodate thin tape 2B.

Figures 3, 4:
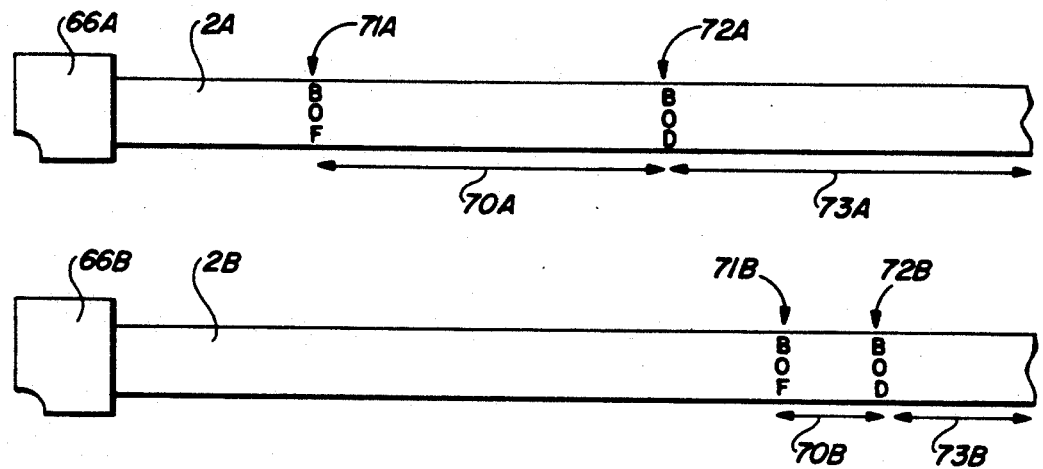
FIG. 3 is a view comparing the leader block reel end of a thick tape and a thin tape.
FIG. 4 is a table listing some of the control bits used by the control unit.

Referring to FIG. 3, the tape 2 can either be a thick tape 2A or a thin tape 2B. The take-up reel or leader block ends of tapes 2A and 2B are attached to leader blocks 66A and 66B respectively. Tape 2A includes a FID written in a region 70A thereon defined by BOF 71A and BOD 72A. Tape 2B includes a FID written in a region 70B thereon defined by BOF 71B and BOD 72B. Region 70B is located further from leader block 66B than region 70A is from leader block 66A, and BOF 71B and BOD 72B are positioned further from leader block 66B than BOF 71A and BOD 72A are from leader block 66A. Hereinafter, such "locations" and "positions" are defined by the distance from their respective tape leader block.

The locations and positions are further away from leader block 66B to compensate for the aforementioned increase in the susceptibility to deformations in thin tape 2B, while still maintaining adequate performance. Although deformations in a tape are not as likely to interfere with (read/write) access to FIDs as they are to user data, writing a FID from BOF 71A to BOD 72B would degrade performance. Performance would be degraded because each rewind operation, controlled by the device 40 (as previously described), would be back to the BOF 71A—which would be closer to the leader block. Instead, each rewind is to BOF 71B, considerably reducing the time for tape movement. In addition, region 70B is made considerably shorter than region 70A to reduce the amount of time for the head 51 to traverse thereby. Still, region 70B must be long enough to account for the tolerances of the system components/operations, such as the tachometers. The positions and length of regions 73A and 73B are calculated to ensure that deformations are not contained therein.

A tape cartridge contains as much tape as can reliably be wound therein. In the preferred embodiment, the thick tape substrate is approximately 0.00092 inches in thickness and the thin tape substrate is approximately 0.00057 inches in thickness. A thin tape 2B is longer than a thick tape 2A because more wraps of the tape will fit within the tape cartridge. The thin tape 2B is also wound to a larger circumference than is thick tape 2A. Thus, a determination as to the approximate relative length of a tape, using the previously described circumferential tachometer technique, is also an indication as to the relative thickness of the tape. However, in the preferred embodiment, it may not always be possible to clearly distinguish between the possible relative lengths of a tape. A tape length determined to be in the expected relatively short length range of thick tape is hereinafter referred to as "short". A tape length determined to be in the expected relatively long length range of thin tape is hereinafter referred to as "long". A tape length determined to be in a length range intermediate that of short and long tape is hereinafter referred to as "marginal" (because the tape length, and hence also the tape thickness, is indeterminate).

A thin tape 2B may be written to or read from in a 36-track tape system, but not in an 18-track tape system, as previously described. Thus, a thin tape 2B cannot have 18-track format data written thereon. A thick tape 2A may be written to or read from in an 18-track tape system, provided there is no 36-track format data thereon (or provided the data is to be overwritten on all of the 36-track format data thereon). A thick tape 2A may also be written to in a 36-track tape system, provided there is no 18-track format data thereon or provided the 18-track data thereon is overwritten. In addition, 18-track format data written on a thick tape 2A may be read by a 36-track tape system. A tape cartridge 52 may be inserted into an 18-track tape system or a 36-track tape system. Thus, the tape systems are able to distinguish between different tape lengths, thicknesses, and tape formats to minimize attempts to access data on tapes incompatible therewith.

Referring to FIG. 4, some of the PERFORM DRIVE FUNCTION (PDF) bits used by a control unit 10 to issue commands to a device 40 that are compatible with the tape 2 therein will now be described. The particular bits shown are for use in a 36-track tape system. The 0 bit is set to zero or one to select the use of the odd or even 18-track set. The 1 bit is set to zero or one to indicate a tape written to in 36-track format or in 18-track format. The 3 bit is set to zero or one to indicate a thick or a thin tape. The 4 bit is set to zero or one to set the positioning parameters in the device for the particular tape thickness, as indicated by the value of bit 3. Other parameters might be defined by other PDF bits. By defining the proper operating parameters to a device 40, a control unit 10 can minimize the number of operations attempted which are incompatible with a tape mounted in a tape system.

METHODS OF OPERATION

Referring to FIGS. 5-11, methods of preventing the performance of an incompatible operation will be described for both an 18-track tape system and a 36-track tape system. In the methods, an error is returned any time a FID is detected which is of a type other than the 18-track or the 36-track FID, but such is not shown in the flowcharts described herein for convenience. The methods are embodied in machine logic or microcode, as is known in the art.

Figure 5:
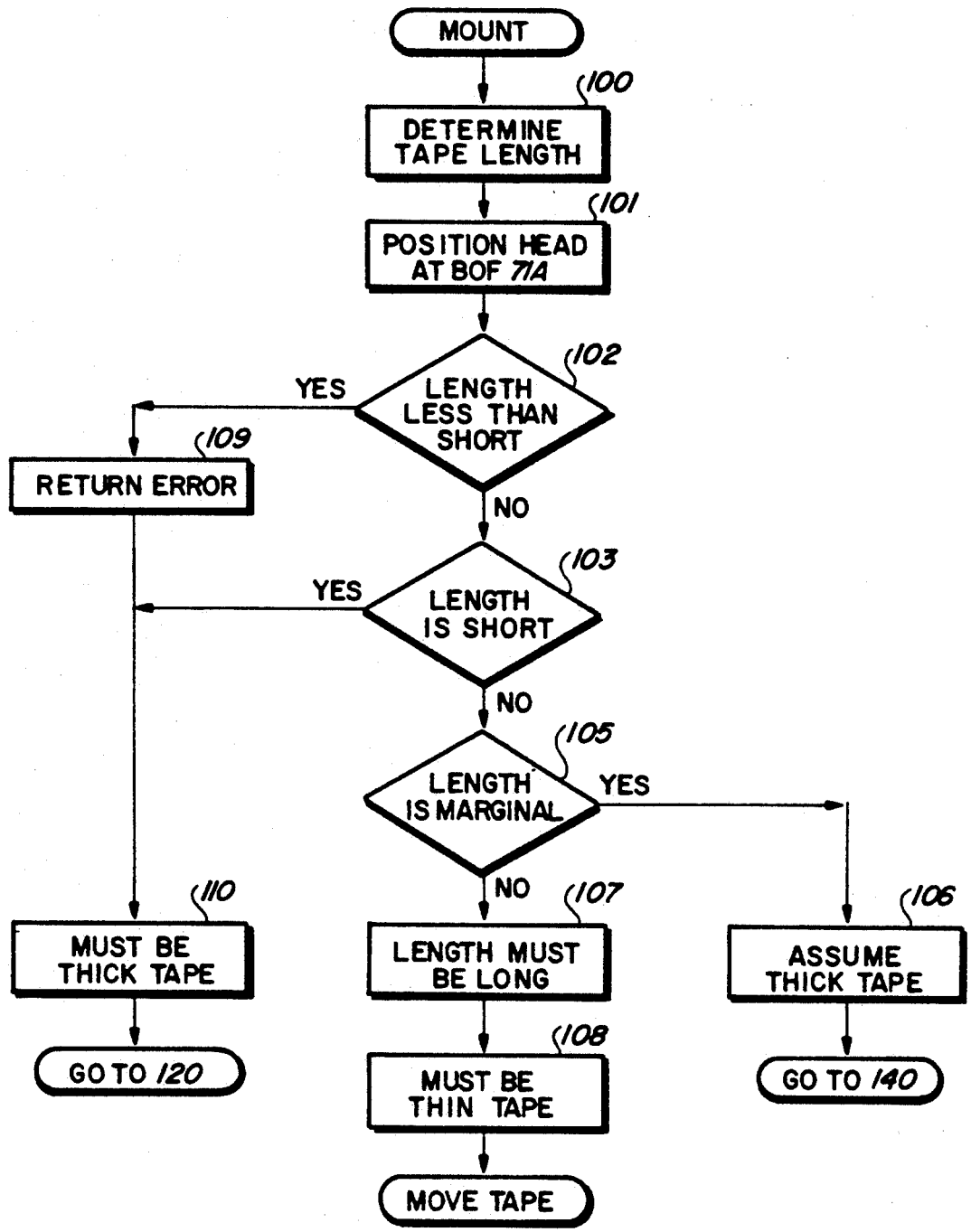

Referring to FIGS. 5-7, the method of operating an 18-track tape system will now be described. FIG. 5 shows operations primarily directed by device 40 (control unit 10 is logically disconnected from device 40). FIGS. 6-7 show operations directed by control unit 10 (control unit 10 is logically connected to device 40). Information which must be temporarily stored during the described operations is retained in the control stores of the control unit 10 and the device 40. The method may be implemented in machine logic or microcode.

The method begins when a tape cartridge is mounted in the tape system. As the tape is threaded through the tape path 50, tachometers 56 and 58 are used to determine the tape length at step 100. At step 101, the head 51 is initially positioned at BOF 71A which is the BOF normally associated with a thick tape 2A. Steps 102, 103, and 105 branch according to the determined length of the tape. If the tape length is less than that expected of a short tape, an error message is returned to the CPU 1 at step 109. Although the tape length is less than normally anticipated, the tape must nevertheless be a thick tape 2A and is so designated at step 110, and the flow continues at step 120. If the tape length is determined to be marginal, the tape is assumed to be a thick tape 2A at step 106 and the flow continues at step 140. Otherwise, the tape length must be long, as shown in step 107. At step 108, the tape is designated a thin tape 2B which must be moved to a 36-track tape system for writing data thereto or reading data therefrom.

Thick tape 2A is compatible with the 18-track tape system. At step 120, the type of FID in region 70A, if any, is determined. If an 18-track FID is found, step 121 branches to step 126 for data access operations in region 73A. An 18-track format is compatible with the 18-track tape system.

If no 18-track FID is found, step 121 branches to step 122, which branches to step 123 if a 36-track FID is found. A 36-track format is not compatible with the 18-track tape system. Step 123 therefore branches again. If the 36-track data on the tape is not to be overwritten with 18-track data, the tape must be moved to a 36-track tape system for writing data thereto or reading data therefrom. If the 36-track data on the tape is to be overwritten, step 123 branches to step 125 to reposition the head 51 back to BOF 71A and write an 18-track FID on the tape before the data access operations occur at step 126. If at step 122 a 36-track FID is not found, the tape must be blank and the flow continues at step 125 as just described. Data access operations then occur in region 73A at step 126.

Thick tape 2A is compatible with the 18-track tape system, but thin tape 2B is not. If the tape is determined to be of marginal length, at step 140 the type of FID in region 70A, if any, is determined. If an 18-track FID is found, step 141 branches to step 149 for data access operations in region 73A. An 18-track format is compatible with the 18-track tape system. If no 18-track FID is found, step 141 branches to step 142, which branches to step 143 if a 36-track FID is found. A 36-track format is not compatible with the 18-track tape system. Step 143 therefore branches again. If the 36-track data on the tape is not to be overwritten with 18-track data, the tape must be moved to a 36-track tape system for writing data thereto or reading data therefrom. If the 36-track data on the tape is to be overwritten, step 143 branches to step 148 to reposition the head 51 back to BOF 71A and write an 18-track FID on the tape before the data access operations occur at step 149.

If at step 142 a 36-track FID is not found, the tape might be a thin tape 2B as the tape length was marginal and the tape was merely assumed to be thick at step 106. In such a case, there is no FID in region 70A and the head 51 continues to BOF 71B at step 144. At step 145, the type of FID in region 70B, if any, is determined. If the tape is indeed a thin tape, there cannot be an 18-track FID in region 70B. If a 36-track FID is found, step 146 branches to have the thin tape 2B moved to a 36-track tape system for writing data thereto or reading data therefrom. A 36-track format is only compatible with a 36-track tape system. If at step 146 a 36-track FID is not found, the tape is considered to be a blank, thick tape 2A after all at step 147. The flow then continues at steps 148 and 149 as previously described.

Figure 8:
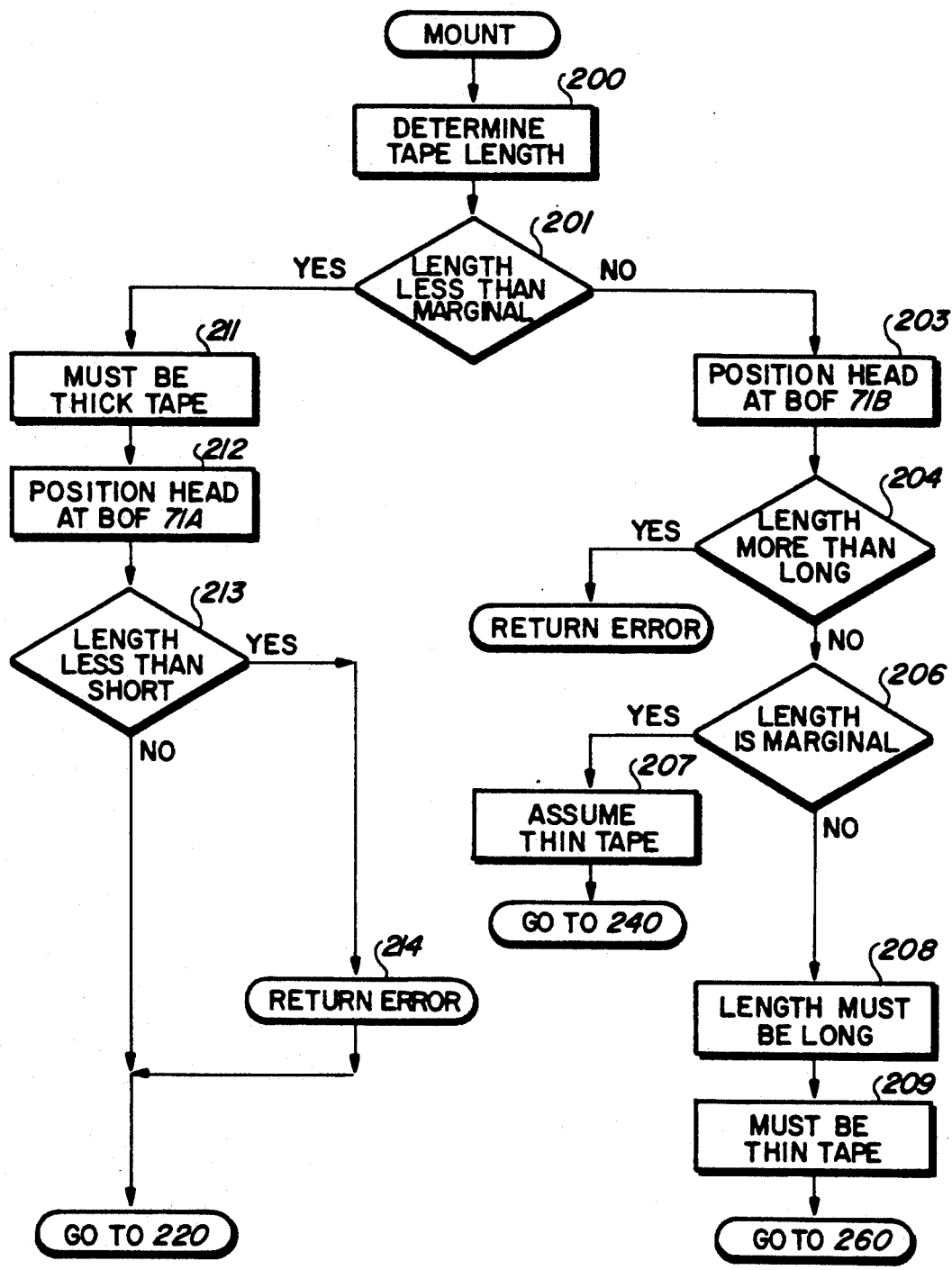
Figure 10:
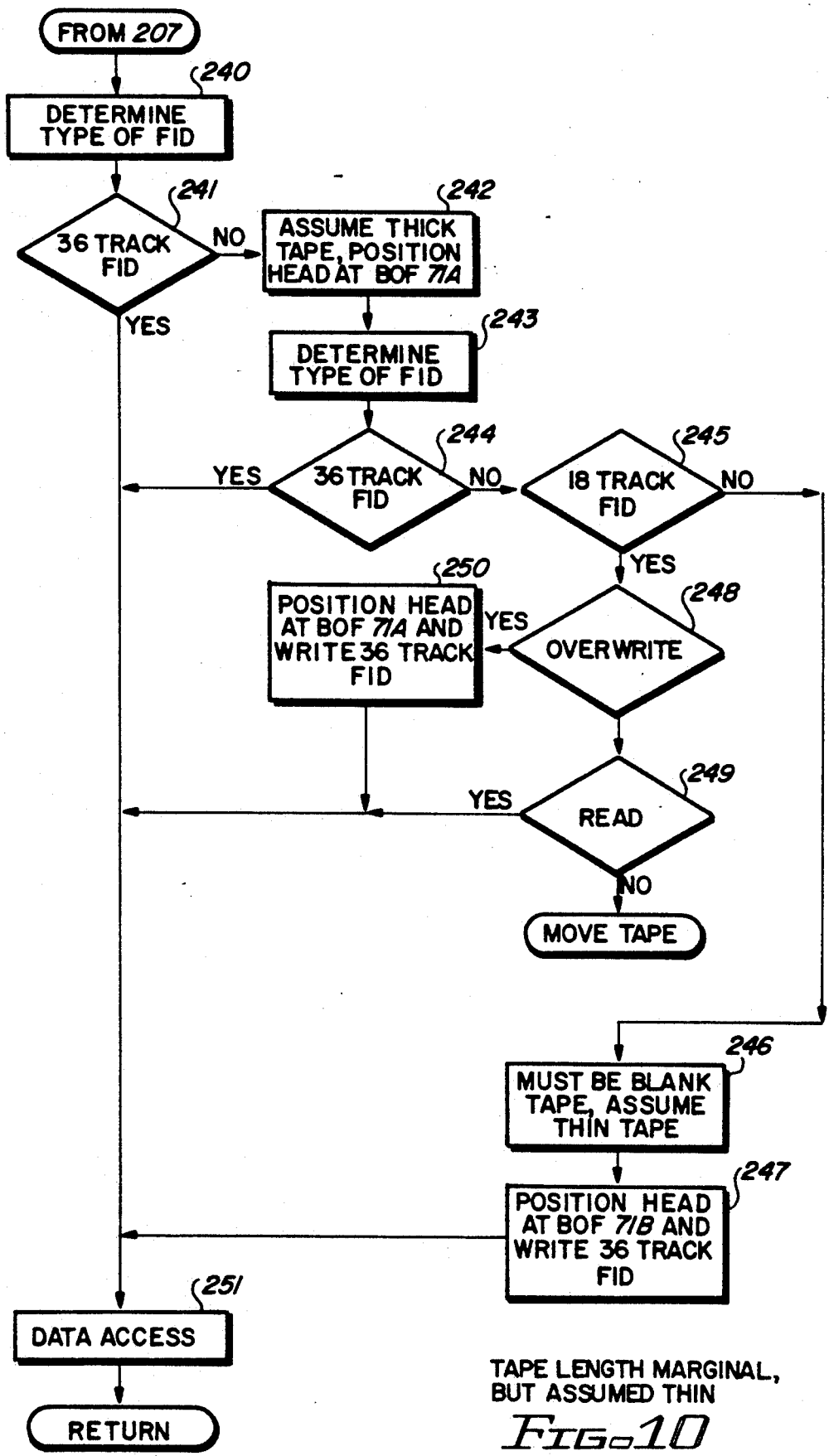

Referring to FIGS. 8-11, the method of operating a 36-track tape system will now be described. FIG. 8 shows operations directed by device 40 (control unit 10 is logically disconnected from device 40). FIGS. 9-11 show operations primarily directed by control unit 10 (control unit 10 is logically connected to device 40). The method may be implemented in machine logic or microcode. Any reference to writing a 36-track FID is performed using the aforementioned technique including the writing of logical zeros on one set of 18 tracks.

The method begins when a tape cartridge is mounted in the tape system. As the tape is threaded through the tape path 50, tachometers 56 and 58 are used to determine the tape length at step 200. Step 201 branches according to the determined length of the tape. If the tape length is less than marginal, the tape is designated a thick tape 2A at step 211. At step 212, the head 51 is positioned at BOF 71A. Step 212 branches further according to the determined length of the tape. If the tape length is less than that expected of a short tape, an error message is returned to the CPU 1 at step 214. Regardless of the outcome of step 213, the flow eventually continues at step 220.

If the tape length is marginal or greater at step 201, the head 51 is positioned at BOF 71B at step 203. Step 204 branches further according to the determined length of the tape. If the tape length is more than that expected of a long tape, an error message is returned to the CPU 1 to indicate that the tape should be demounted. Step 206 also branches according to the determined length of the tape. If the tape length is determined to be marginal, the tape is assumed to be a thin tape 2B at step 207 and the flow continues at step 240. Otherwise, the tape length must be long, as shown in step 208. At step 209, the tape is designated a thin tape 2B and the flow continues at step 260.

Thick tape 2A is compatible with the 36-track tape system. At step 220, the type of FID in region 70A, if any, is determined. If a 36-track FID is found, step 221 branches to step 227 for data access operations in region 73A. A 36-track format is compatible with the 36-track tape system. If no 36-track FID is found, step 221 branches to step 222, which branches to step 223 if an 18-track FID is found. An 18-track format is partially compatible with the 36-track tape system. Step 223 therefore branches again. If the 18-track data on the tape is not to be overwritten with 36-track data, and if step 224 determines that the desired data access is not a read operation, the tape must be moved to an 18-track tape system for writing data thereto. The 36-track tape system can only read 18-track data. If the desired data access is a read operation, step 224 branches to step 227 for data access operations in region 73A. If the 18-track data on the tape is to be overwritten, step 223 branches to step 226 to reposition the head 51 back to BOF 71A and write a 36-track FID on the tape before the data access operations occur at step 227. If at step 222 an 18-track FID is not found, the tape is considered to be blank at step 225 and the flow continues at step 226 as just described.

Thick tape 2A and thin tape 2B are both compatible with the 36-track tape system. If the tape is determined to be of marginal length, at step 240, the type of FID in region 70B, if any, is determined. If a 36-track FID is found, step 241 branches to step 251 for data access operations in region 73B. A 36-track format is compatible with the 36-track tape system. If no 36-track FID is found, the tape might be a thick tape 2A as the tape was only marginally assumed to be thin at step 207. In such a case, there is no FID in region 70B. Thus, the tape is assumed to be thick and the head 51 is repositioned at BOF 71A at step 242. At step 243, the type of FID in region 70A, if any, is determined. If the tape is indeed a thick tape, there can be either an 18-track FID or a 36-track FID in region 70A. If a 36-track FID is found, step 244 branches to step 251 for data access operations in region 73A. If at step 244 a 36-track FID is not found, step 245 branches again. If an 18-track FID is not found, step 245 branches to step 246 and the tape is considered to be a blank, thin tape 2B after all. At step 247, the head 51 is repositioned at BOF 71B, a 36-track FID is written in region 70B, and the data access operations occur in region 73B at step 251.

An 18-track format is partially compatible with the 36-track tape system. Thus, if an 18-track FID is found at step 245, step 248 branches again. If the 18-track data on the tape is not to be overwritten with 36-track data, and if step 249 determines that the desired data access is not a read operation, the tape must be moved to an 18-track tape system for writing data thereto. The 36-track tape system can only read 18-track data. If the desired data access is a read operation, step 249 branches to step 251 for data access operations in region 73A. If the 18-track data on the tape is to be overwritten, step 248 branches to step 250 to reposition the head 51 back to BOF 71A and write a 36-track FID on the tape before the data access operations occur at step 251.

A thin tape 2B is compatible with a 36-track tape system. At step 260, the type of FID in region 70B, if any, is determined. If a 36-track FID is found, step 261 branches to step 264 for data access operations in region 73B. A 36-track format is compatible with the 36-track tape system. If no 36-track FID is found, step 261 branches to step 262 and the tape is considered to be a blank, thin tape 2B. At step 263, the head 51 is repositioned back to BOF 71B and a 36-track FID is written in region 70B. Data access operations then occur in region 73B at step 264.

The remaining features of the tape systems are not relevant to the subject invention. Additional description of the tape system may be found in the following references, each of which is hereby incorporated by reference: U.S. Pat. Nos. 4,125,881, 4,435,762 and 4,467,411 disclose various aspects of the operation of a tape system, U.S. Pat. Nos. 4,334,656, 4,399,936, 4,389,600 and 4,406,425 disclose various aspects of the tape path for a tape system, U.S. Pat. No. 4,685,005 discloses a 36-track interleaved transducing head for a tape system, U.S. Pat. No. 4,452,406 discloses a tape cartridge for a tape system, and U.S. Pat. Nos. 4,454,282, 4,525,424 and 4,568,611 disclose tape media for a tape system. Also, 18-track and 36-track recording formats are described in ANSI standard X3,180 and proposed ANSI standard X3.B5/91-305, respectively, each of which is hereby incorporated by reference.

While the invention has been described with respect to a preferred embodiment thereof, it will be understood by those skilled in the art that various changes in detail may be made therein without departing from the spirit, scope, and teaching of the invention. For example, the invention has been described for use in a magnetic tape system, but could be embodied in any applicable peripheral storage system employing removable, sequentially recorded storage media. Also, different types of FIDs, transducers, recording formats, means for determining the characteristics of the storage media, etc. may be used. Accordingly, the invention disclosed herein is to be limited only as specified in the following claims.

What is claimed is:

1. A peripheral storage system for reading data on a removable data storage medium mounted therein, the data storage medium having a formal identifier (FID) in one of a plurality of locations thereon, the system comprising:
   a transducing head;
   machine-executed means for moving the data storage medium relative to the transducing head;
   machine-executed means for controlling the transducing head to read the data on the data storage medium; and
   machine-executed means for assessing at which one of the plurality of locations the FID is located.

2. The system of claim 1 wherein the machine-executed means for controlling the transducing head to read the data employs a sequential access method.

3. The system of claim 1 wherein the machine-executed means for assessing determines whether the data storage medium is a first data storage medium having a FID at a first location thereon or a second data storage medium having a FID at a second location thereon, the first location being different than the second location.

4. The system of claim 3 wherein the first location extends from a first position to a second position on the first data storage medium and the second location extends from a third position to a fourth position on the second data storage medium, the second position being different than the fourth position.

5. The system of claim 3 wherein the first data storage medium is shorter in length than the second data storage medium.

6. The system of claim 3 wherein the first data storage medium is thicker than the second data storage medium.

7. The system of claim 3 wherein the FID is one of a plurality of types of FIDs, the system further comprising machine-executed means for assessing the type of the FID.

8. A tape system for reading on a tape mounted therein, the tape having a formal identifier (FID) in one of a plurality of locations thereon, the system comprising:
   a transducing head;
   machine-executed means for moving the tape relative to the transducing head;
   machine-executed means for controlling the transducing head to read the data on the tape; and
   machine-executed means for assessing at which one of the plurality of locations the FID is located.

9. The system of claim 8 wherein the machine-executed means for assessing determines whether the tape is a first tape having a FID at a first location thereon or a second tape having a FID at a second location thereon, the first location being different than the second location.

10. The system of claim 9 wherein the first location extends from a first position to a second position on the first tape and the second location extends from a third position to a fourth position on the second tape, the second position being different than the fourth position.

11. The system of claim 9 wherein the first tape is shorter in length than the second tape.

12. The system of claim 9 wherein the first tape is thicker than the second tape.

13. The system of claim 9 wherein the FID is one of a plurality of types of FIDs, the system further comprising machine-executed means for accessing the type of the FID.

14. The system of claim 10 wherein the first tape is thicker than the second tape, the first tape having a first leader block at an end thereof, the second tape having a second leader block at an end thereof, the second position being further from the first leader block than the first position is from the first leader block, the fourth position being further from the second leader block than the third position is from the second leader block, the fourth position being further from the second block than the second position is from the first leader block.

15. A tape system for reading data on a tape mounted therein, the system comprising:
   a transducing head;
   machine-executed means for moving the tape relative to the transducing head;
   machine-executed means for controlling the transducing head to read the data on the tape; and
   machine-executed means for determining the thickness of the tape, and:
   when the tape is determined to be of a relatively large thickness, for adjusting the tape tension to a first constant value;
   when the tape is determined to be of a relatively small thickness, for adjusting the tape tension to a second constant value.

16. The system of claim 15 further comprising machine-executed means for determining the format used to record the data on the tape.

17. The system of claim 15 wherein the machine-executed means for determining the thickness of the tape includes means for approximating the length of the tape.

18. A tape system for reading data on a tape mounted therein, the tape having at one of a plurality of locations thereon, the system comprising:
   a transducing head;
   machine-executed means for moving the tape relative to the transducing head;
   machine-executed means for controlling the transducing head to the data on the tape; and
   machine-executed means for determining the thickness of the tape and:
   when the tape is determined to be of a relatively large thickness, for reading a format identifier (FID) if any, at a first one of the locations;
   when the tape is determined to be of a relatively small thickness, for reading a FID, if any, at a second one of the locations.

19. The tape system of claim 18 wherein the tape includes a supply end and a take-up end, the first and second locations beginning relatively close to the take-up end and ending relatively far from the take-up end, the first location ending closer to the take-up end than the second location ends.

20. The tape system of claim 18 further comprising machine-executed means for assessing the type of the FID.

21. The tape system of claim 18 wherein the machine-executed means for determining the thickness of the tape includes means for reading a FID, if any, at the second one of the locations if, after the tape is determined to be of a relatively large thickness, no FID is found at the first location.

22. A tape system for writing data on a tape mounted therein, the system comprising:
a transducing head;
machine-executed means for moving the tape relative to the transducing head;
machine-executed means for determining the thickness of the tape; and
machine-executed means for controlling the transducing head to write a format identifier (FID) first location on the tape if the tape is determined to be of a relatively large thickness, and to write a FID at a second location on the tape if the tape is determined to be of a relatively small thickness.

23. The tape system of claim 22 wherein the tape includes a supply end and a take-up end, the first and second locations beginning relatively close to the take-up end and ending relatively far from the take-up end, the first location ending closer to the take-up end than the second location ends.

24. A first and a second tape system for writing data on a tape mounted respectively therein, the first system comprising:
a first transducing head;
first machine-executed means for moving the tape relative to the first transducing head;
first machine-executed means for determining, upon mounting of the tape in the first system, the thickness of the tape therein; and
first machine-executed means for controlling the first transducing head to write data on the tape in a first format if the thickness of the tape is compatible with the first system; and
the second system comprising:
a second transducing head;
second machine-executed means for moving the tape relative to the second transducing head;
second machine-executed means for determining, upon mounting of the tape in the second system, the thickness of the tape therein; and
second machine-executed means for controlling the second transducing head to write data on the tape in a second format if the thickness of the tape is compatible with the second system.

25. The first and second systems of claim 24 wherein the first system further comprises first machine-executed means for determining whether data on the tape is in the first or second format, and the second system further comprises second machine-executed means for determining whether data on the tape is in the first or second format.

26. A method for determining whether a tape mounted in a tape system is compatible therewith, the method comprising the machine-executed steps of:
determining the thickness of the tape;
when the tape is determined to be of a relatively large thickness, reading a format identifier (FID), if any, at a first location on the tape; and
when the tape is determined to be of a relatively small thickness, reading a FID, if any, at a second location on the tape.

27. The method of claim 26, further comprising the machine-executed step of assessing the type of the FID.

28. The method of claim 26 further comprising the machine-executed step of reading a FID, if any, at the second location if, after the tape is determined to be of a relatively large thickness, no FID is found at the first location.

29. The method of claim 26 wherein the tape includes a supply end and a take-up end, the first and second locations beginning relatively close to the take-up end and ending relatively far from the take-up end, the first location ending closer to the take-up end than the second location ends.

30. The method of claim 26, further comprising the machine-executed steps of:
if the tape thickness is indeterminate:
reading a FID, if any, at one of the first and second locations;
if no FID is found at said one of the first and second locations, reading a FID, if any, at the other of the first and second locations; and
if no FID is found at the other of the first and second locations, writing a FID at said one of the first and second locations.

31. A method for writing data on a tape mounted in a tape system, the method comprising the machine-executed steps of:
determining the thickness of the tape;
when the tape is determined to be of a relatively large thickness, writing a first type of format identifier (FID) at a first location on the tape; and
when the tape is determined to be of a relatively small thickness, writing a second type of FID at a second location on the tape.

32. The method of claim 31 wherein the tape includes a supply end and a take-up end, the first and second locations beginning relatively close to the take-up end and ending relatively far from the take-up end, the first location ending closer to the take-up end than the second location ends.

* * * * *

UNITED STATES PATENT AND TRADEMARK OFFICE
CERTIFICATE OF CORRECTION

PATENT NO. :      5,245,485
DATED      :      September 14, 1993
INVENTOR(S) :     Edwin C. Dunn, et al.

It is certified that error appears in the above-identified patent and that said Letters Patent is hereby corrected as shown below:

ON THE TITLE PAGE:
Item [75]   Inventors:   Edwin C. Dunn; Orvid B. Jeppson;
                         Ronald K. Rhodes; Steven B. Wilson,
                         all of Tucson, Ariz.

(Ronald K. Rhodes' name was omitted.)

At column 12, line 60, the words "head to the data" should be --head to read the data--.

At column 13, line 24, the words "identifier (FID) first" should be --identifier (FID) at a first--.

Signed and Sealed this

Nineteenth Day of April, 1994

Attest:

BRUCE LEHMAN

*Attesting Officer*          Commissioner of Patents and Trademarks